Figure 1:
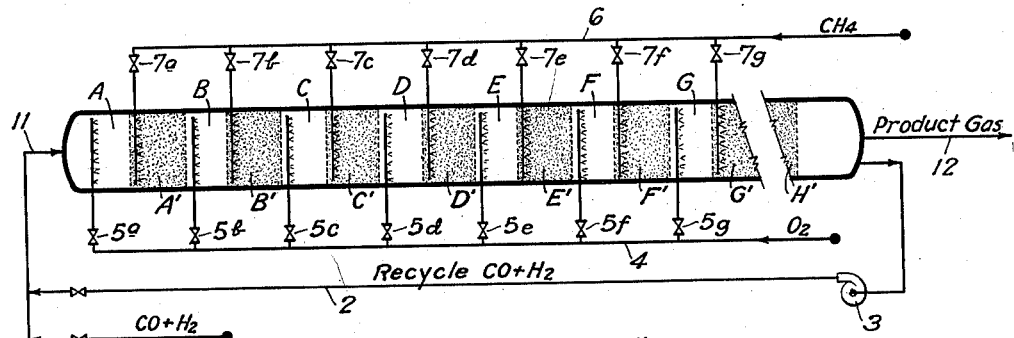

April 21, 1953  E. L. D'OUVILLE  2,635,952
MANUFACTURE OF HYDROGEN-CARBON MONOXIDE MIXTURE
Filed July 5, 1946

Inventor:—
Edmond L. d'Ouville
By Donald E. Payne
Attorney

Patented Apr. 21, 1953

2,635,952

UNITED STATES PATENT OFFICE 2,635,952

MANUFACTURE OF HYDROGEN-CARBON MONOXIDE MIXTURE

Edmond L. d'Ouville, Chicago, Ill., assignor to Standard Oil Company, Chicago, Ill., a corporation of Indiana Application July 5, 1946, Serial No. 681,479

1 Claim. (Cl. 48—196)

This invention relates to the manufacture of synthesis gas consisting essentially of hydrogen and carbon monoxide, and it pertains more particularly to a process for manufacturing such synthesis gas from substantially nitrogen-free oxygen and gaseous hydrocarbons such as methane.

Synthesis gas, sometimes referred to as "make gas" is a mixture of hydrogen and carbon monoxide usually in the ratio of from 2:1 to 1:1. This is suitable for the synthesis of hydrocarbons and oxygenated hydrocarbons or other organic compounds by reactions commonly known as "synthol," Fischer or Fischer-Tropsch, or modifications thereof, which are usually effected by the use of iron or cobalt catalysts. Heretofore synthesis gas has been produced by water gas reactions, etc., but all processes heretofore employed have been unduly expensive. The most promising process where natural gas is available, has been the partial combustion of methane with oxygen since such combustion should theoretically give a synthesis gas containing a minimum of diluents and without the requirement of large amounts of heat from external sources. Heretofore, however, the partial combustion of methane with oxygen has not been completely successful. Operations on a large scale have been unsuccessful because certain side reactions could not be avoided. For example, a certain amount of methane was converted to coke, carbonaceous deposits or soot which caused a plugging or fouling of the make gas system, rendering it inoperative or requiring at the very least a scrubbing means for finely divided carbon suspended in a gaseous product. Furthermore, these side reactions increased the oxygen requirement above the theoretical so that it was necessary to use a ratio often as high as 1:1 oxygen to methane instead of 1:2 oxygen to methane which would be required if the reaction followed the ideal course. This is especially important since the cost of oxygen is relatively high and the economy of the process depends upon its efficient use.

An object of my invention is to provide an improved method for converting oxygen and methane into carbon monoxide and hydrogen avoiding the formation of suspended carbon or carbonaceous deposits. Another object of my invention is to provide a method for the conversion of methane to carbon monoxide and hydrogen by means of oxygen in which the oxygen efficiency is high. Another object of my invention is to provide a method for the production of synthesis gas which avoids the necessity for the indirect transfer of large amounts of heat through tube walls at high temperature levels. Another object is to provide a process of high thermal efficiency for the production of high yields of carbon monoxide and hydrogen from methane. Still another object of my invention is to provide a process for the production of synthesis gas from methane which can be operated at high pressures. Other objects of the invention will be apparent from the detailed description which follows:

I avoid the degradation of methane to carbon by introducing the oxygen into the system at a point where the methane concentration is low, i. e., less than 10% and preferably less than 5% by volume. More specifically, I contact oxygen with carbon monoxide and hydrogen at a high temperature in a first zone under conditions to produce intermediate products consisting essentially of carbon dioxide and steam, and liberating and making available large amounts of heat. The gaseous products, carbon dioxide and steam, as well as the heat liberated in the first zone, are then transferred to a second zone wherein methane or other gaseous hydrocarbons, is introduced, and wherein conditions are maintained for converting said methane, transferred carbon dioxide and steam, by endothermic reactions into carbon monoxide and hydrogen.

The carbon monoxide and hydrogen converted exothermically in the first zone may be a portion of the carbon monoxide and hydrogen produced which is recycled or it may be all or a portion of the unconverted synthesis gas from the synthol reactor. Oxygen never comes in direct contact with high concentrations of methane, and the formation of coke or carbon by side reactions is eliminated. The heat liberated in the first zone is sufficient if transferred substantially in its entirety, to supply the endothermic requirements of the second zone. In fact, the net reaction is slightly exothermic so that the process remains operable in spite of moderate heat losses through the walls of the reactor. However, I prefer to insulate the apparatus so as to minimize these losses and to preheat the methane and/or the oxygen by conventional heat exchange methods before introduction into the converter.

It is desirable that both the natural gas and oxygen contain a minimum amount of inert diluents such as nitrogen. In order to maintain the desired heat balance and avoid the necessity of preheating to excessive temperatures the nitrogen content of the feed gas should be less than 15% by volume based on combined natural gas and oxygen.

The reactions which take place in the primary and secondary zones are as follows:

*First zone*

(a) $CO + \frac{1}{2}O_2 \rightarrow CO_2 + 67,960$ cal.
(b) $2H_2 + O_2 \rightarrow 2H_2O + 136,830$ cal.

*Second zone*

(a) $2CH_4 + 2H_2O \rightarrow 2CO + 6H_2 - 122,220$ cal.
(b) $CH_4 + CO_2 \rightarrow 2CO + 2H_2 - 61,016$ cal.

*Net reaction*

(a) $3CH_4 + 1\frac{1}{2}O_2 \rightarrow 3CO + 6H_2 + 11,554$ cal.

The invention may be practiced with or without catalysts with various types of equipment, but I prefer to employ catalysts such as supported or unsupported nickel. A suitable catalyst can be prepared by impregnating a porous refractory support such as alumina, acid treated clays, zeolytes or similar materials with nickel nitrate, heating to decompose the nitrate, and reducing the resultant oxide. A desirable nickel content is about 3% by weight. Traces of other metals such as magnesium are desirable. Combustion may be effected in a heavily insulated combustion chamber in the absence of a catalyst and the heat of reaction may be transferred from the primary to the secondary zone as superheat of the effluent combustion products, but such operation requires the use of considerably higher operating temperatures in order to obtain the same oxygen efficiency.

Fundamentally, my process involves multiple zone operation. The oxidants and energy required for the conversion of methane in a second zone are generated in the first zone. Methane is introduced into the second zone and is thus contacted only with the products of the first zone and not directly with oxygen. This invention can be practiced by the use of a catalyst in several different kinds of equipment. These kinds of equipment differ in the means by which heat is transferred from the primary to the secondary zones, but they have in common the transfer of the gaseous products from the first zone to the second zone where they react with injected methane in a zone characterized by the absence of free oxygen. The transfer of heat from the primary to the secondary zone can be accomplished in a practical manner by three common devices. It can be transferred for example, as sensible heat of the effluent gases. It can also be transferred as sensible heat of the gases and catalysts, provided a fluid system or moving bed system which permits the transfer of catalyst and product gases is used. Furthermore, the heat produced by the combustion in the first zone can be used in the second zone by using a regenerative system in which a solid material stores the heat produced during combustion and subsequently releases said heat during the methane reforming operation. The preferred method of transferring heat depends upon circumstances such as the size of the operation intended and the purity of the product required. It is my intention to describe three embodiments of my invention in which each of the three methods of heat transfer is efficiently practiced.

Figure 2:
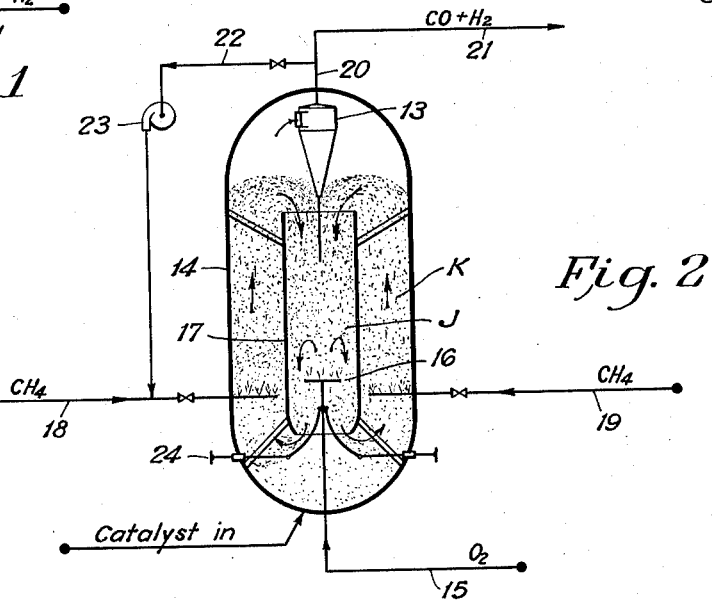
Figure 3:
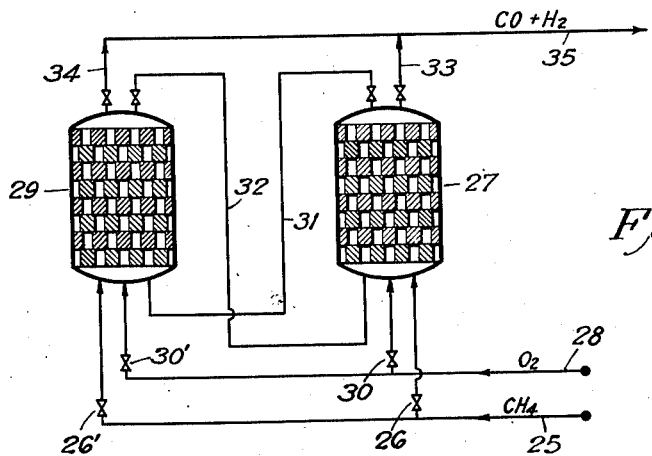

The invention will be more clearly understood from the following detailed description of specific examples illustrating each embodiment read in conjunction with the accompanying drawings which form a part of the specification and in which Figure 1 is a schematic flow diagram of a fixed bed synthesis gas production system;

Figure 2 is a schematic flow diagram of a fluidized synthesis gas production system; and Fig. 3 is a regenerative synthesis gas production system.

The use of a fixed bed operation requires that the heat be transferred as sensible heat of the effluent gases. Since said sensible heat is relatively small, I prefer to use multi-stage operation when this means of heat transfer is used. A suitable apparatus as described is shown in Figure 1. Zones, A, B, C, D and E, etc., are combustion zones, while A', B', C', D' and E', etc., are reforming zones. In the combustion zones, carbon monoxide and hydrogen usually in excess, are contacted with oxygen so that carbon dioxide and water are produced and a substantial increase in temperature, for example, 1500° F. to 1700° F., takes place with complete consumption of the oxygen. In the combustion zones, the super-heated carbon dioxide and steam react with methane, which is introduced just prior to, or directly into, the reforming zone, producing carbon monoxide and hydrogen in excess of that consumed in the combustion zone. In a single pair of combustion and reforming zones, it is possible to effect an increase of about 5-6% in volume operating on a temperature differential between these zones of about 200° F. I prefer to use 13 or more stages in order to double the volume of the recycle gas entering the converter. The depth of catalyst in each zone may be increased so as to give a constant contact time in each zone as the volume of the gases increases. Frequently, it is advisable to use as many as 26 stages so that only about one quarter of the product gas need be recycled or 75% conversion in the synthol reactor effected. It is preferred that a nickel catalyst, either supported or unsupported, be used in the reforming zones. A catalyst need not be used in the combustion zone since the combustion reaction is extremely rapid even in the absence of a catalyst. However, in order to secure simplicity of design, a catalyst may be used in both zones whereupon my invention with this type of fixed bed apparatus resolves itself to simple spaced injection of oxygen and methane at points sufficiently remote along an insulated catalyst bed so that substantially all the oxygen is consumed prior to the point of methane injection.

In a unit producing 120,000,000 cubic feet per day of synthesis gas operating according to my invention and using fixed bed operation, oxygen and methane would be injected at about 26 points each along the catalyst bed. A gas, preferably recycled from the synthol converter, containing 30,000,000 cubic feet of carbon monoxide and hydrogen and preheated to 1500° F., would be fed to the converter through line 1. Alternatively, this gas could be a suitable fraction of the product gas recycled through line 2 by means of impellor 3. The carbon monoxide and hydrogen from lines 1 and/or 2 enter the converter by means of line 11 and react with oxygen carried by a manifold 4 and entering zone A through valve 5a. The products of combustion, now at a temperature of 1700° F., or 200° above the initial temperature, are admixed with methane carried by manifold 6 and admitted to the reforming zone A' through valve 7a at the interface between combustion zone A and reforming zone A'. The reaction taking place in the reforming zone is endothermic so that the gases which are primarily carbon monoxide and hydrogen entering combustion zone B have again been cooled to approximately 1500° F. Further oxygen is now injected through valve 5b and the temperature again increased to approximately 1700° F. The cycle is thus repeated with alternate combustion and reforming taking place throughout the length of the catalyst bed. The converter could be operated at higher temperatures if desired or with fewer stages. It is essential, however, that direct contact of oxygen with high concentrations of methane be avoided. The net production of gas is carried by line 12 to the synthol converter or to whatever use is intended for the synthesis gas thus produced. The maximum and minimum temperatures should fall within the broad limits of 1400° F. to 1800° F. At temperatures below 1400° F., the rate of reaction is low and the equilibrium carbon dioxide and water content higher. At temperatures above 1800° F., it is difficult to operate under the desired pressure, i. e., 50 to 500 p. s. i. because of the creep stresses of the metals of construction. The range of 1500° F. to 1700° F. is preferred. However, even narrower ranges such as 1550° F. to 1650° F. are suitable especially when there is considerable flow of heat from zone to zone by conduction.

A fluidized solids system offers outstanding advantages since the solids may act heat transfer carriers and enable the use of a single pair of zones instead of the use of a series of zones as is necessary in the case of fixed bed operation. Furthermore, the use of a fluidized solids system permits the internal recycle of sufficient carbon monoxide and hydrogen as aeration gas eliminating the necessity of mechanical compressors for this purpose. The turbulence in fluidized solids systems makes possible close temperature control which is highly advantageous for uniform quality of product. It also permits the introduction of fresh catalyst to compensate for decreases in catalyst's activity and losses.

Figure 2 is a schematic flow diagram of a synthesis gas unit operating on methane and oxygen embodying the fluids-solids principle. In the combustion zone J downcoming carbon monoxide and hydrogen react with oxygen in the presence of a finely divided solid material such as metallic nickel or finely divided supported nickel catalyst. The products of combustion are carbon dioxide and steam and the heat of reaction is absorbed by the solids and gases and is carried therewith into the reforming zone K. In this zone K, methane is introduced and reacts endothermically with the superheated carbon dioxide and steam from the combustion zone, the necessary heat of reaction being transferred from zone J to zone K stored in both the solids and gases. A fraction of carbon monoxide, hydrogen and substantially all catalytic solids flow from the top of the reforming zone K downward through the combustion zone K maintaining therein a constant source of combustible gases and heat-carrying solids. The net production of synthesis gas is removed through a cyclone separator 13. Sufficient heat is produced by the exothermic reactions in zone J to sustain the endothermic reactions in zone K. Substantially all of the oxygen introduced into zone J is consumed before the downcoming gases and solids enter zone K where methane is introduced. Thus, there is no direct contact between oxygen and methane although both gases are introduced simultaneously into the converter 14. The deposition of carbon which invariably results from contacting methane with a deficiency of oxygen is eliminated.

In a fluidized solids unit producing 120,000,000 cubic feet per day, 20,000,000 cubic feet of oxygen is introduced through line 15 to distributor means 16 located preferably below the vertical mid-point in the combustion zone J which may be separated from the reforming zone K by a cylindrical wall 17. About 40 million cubic feet per day of methane are introduced by lines 18 and 19 into the reforming zone K wherein it reacts endothermically with carbon dioxide and steam from the combustion zone, the heat being supplied by the exothermic reaction in the combustion zone. The temperature differential between the combustion zone and the reforming zone can be 200° F. or less. Thus, there is an increase in temperature in the downflowing reactants in combustion zone J and a decrease in temperature in the upflowing reactants in reforming zone K. The catalytic solids flow downward in J and upward in K and an internal recycle of this catalytic heat carrying solids is maintained. Sufficient gas of aeration is entrained in the finely divided solids entering J to react with the oxygen entering by line 15 and distribution means 16. The net production of synthesis gas is removed through cyclone separator 13, lines 20 and 21. A fraction of this gas may, if desired, be recycled through line 22 and compressor 23 for the purpose of controlling the catalyst density in the reforming zone K, which in turn controls the rate of internal recycle of the heat-carrying solids. I prefer to operate under about 25 atms. pressure and to maintain a temperature in the lower portion of the combustion zone of about 1600° F., and at the top of the reforming zone of about 1500° F. I prefer to maintain an average dense phase catalyst density in the combustion zone of about 30 pounds per cubic foot and an average density in the reforming zone of about 20 pounds per cubic foot. The difference in pressure is more than sufficient to maintain the necessary internal recycle of solids and said recycle can be controlled if desired by mechanical means 24.

When operating at lower pressures, for example, 20 atmospheres or as little as 10 atmospheres, it is necessary to use reduced fluid densities in the combustion zone. For example, I may use fluid density of from 15 to 25 pounds per cubic foot in combustion zone in conjunction with fluid densities of from 10 to 20 pounds per cubic foot in the reforming zone, the density differential being about 5 pounds more or less.

The specific heat of my preferred catalyst is of the order of 0.14 calory per gram per degree F. It is necessary to transfer about 12 pounds of catalyst per cubic foot of methane introduced into the reforming zone while operating at the abovementioned temperature differential of 100° F. Smaller amounts of catalyst may be circulated if a higher temperature differential, for example, 200° F., is maintained. Likewise, if a catalyst of higher specific heat is used, for example, a catalyst of 0.3 calory per gram per degree F., about 6 pounds of solids per cubic foot of methane is sufficient using the 100° differential.

In a unit converting 40,000,000 cubic feet per day of natural gas using the preferred catalyst and the 100° F. differential, 10,000 tons per hour of catalyst will be transferred from the combustion zone to the reforming zone. If the density of material leaving the combustion zone is 30 pounds per cubic foot, sufficient carbon dioxide and steam will be entrained therein to supply the requirement for the reactions taking place in the reforming zone. About 20,000,000 cubic feet of oxygen should be introduced which will burn about 75% of the entrained combustible gases. I prefer to maintain a linear velocity of gas in the reforming zone above the methane inlet of about one to three, preferably two feet per second, and downward velocity of about two to five, preferably three feet per second in the combustion zone.

With a catalyst density of about 30 pounds per cubic foot in the combustion zone and about 20 pounds per cubic foot in the reforming zone, a suitable reactor vessel with a capacity of 120,000,000 cubic feet at normal conditions per day and operating at my preferred conditions, would be cylindrical in shape and have an overall diameter of about 15 feet. The height of the reaction zones themselves would be approximately 30 feet. The overall height of the pressure vessel would be of the order of 40 to 50 feet.

At pressures below 25 atmospheres using the preferred temperature, a correspondingly larger vessel is required. In general, I prefer to use a space velocity in the reforming zone of about 75 to 125 volumes of methane or natural gas measured at normal temperature and the operating pressure per volume of settled catalyst in the reforming zone per hour.

In a regenerative system oxygen and recycled carbon monoxide and hydrogen are reacted in a first reactor which contains solid materials of high heat capacity and preferably catalytic activity. The effluent gases from this first reactor are introduced into a second reactor which has been previously heated to a temperature of approximately 1600° F. to 1800° F. by the combustion of carbon monoxide and hydrogen with oxygen. The methane, carbon dioxide and steam react to produce carbon monoxide and hydrogen, absorbing heat from the said preheated solid catalytic materials. A fraction of the net production of synthesis gas is withdrawn and burned with oxygen in the first reactor to maintain the supply of superheated carbon dioxide and steam. The net production of carbon monoxide and hydrogen is withdrawn from the system supplying the synthesis converter or other synthesis gas consuming operations. After the solid material in the first zone has been increased in temperature from about 1600° F. to 1800° F. and the solid catalytic material in the second zone has been cooled to a temperature no lower than 1400° F., the flow is reversed so that the combustion zone then functions as a reforming zone and the original reforming zone as a combustion zone. Thus, in a unit producing 120,000,000 cubic feet of synthesis gas per day, about 40,000,000 cubic feet per day of methane is introduced through line 25 and valve 26, valve 26' being closed, to reforming zone 27. About 20,000,000 cubic feet of oxygen per day is introduced by means of line 28 to zone 29 through valve 30', valve 30 being closed. There is also introduced into combustion zone 29 about 10,000,000 cubic feet per day of carbon monoxide and hydrogen by line 31, the ratio of hydrogen to carbon monoxide in said gas being approximately 2:1. Leaving zone 29 by line 32 are the products of combustion, carbon dioxide and steam, which enter zone 27 and react with the methane simultaneously introduced. After the catalyst in zone 27 has dropped in temperature to say 1400° F. and the catalyst in zone 29 has increased in temperature from 1600° F. to 1800° F., valve 26 is closed and valve 26' opened. At approximately the same instant, valve 30' is closed and valve 30 opened. Thus, by the opening and closing of the valves in the proper order in the period of a few seconds, the functions of zones 27 and 29 are reversed. Carbon monoxide and hydrogen now pass from zone 27 to zone 28 by line 32 and the net production of carbon monoxide and hydrogen is removed by line 34 and line 35. The time of this cycle will depend to a large extent upon the heat capacity and size of the respective zones. I prefer to operate on a five to twenty minute cycle. Although only two zones are shown in Figure 3, any number of pairs may be used in order to even out production of the synthesis gas. Likewise, provision may be made for purging both the lines and vessels with a gas such as the product gas to eliminate the small carbon depositions which might result from the interaction of $CH_4$ and oxygen during the reversal of the cycle. Again, as in the two previous examples, the oxygen and methane may be preheated to as much as 1000° F. or more in order to maintain the thermal balance of the system. Obviously, the transfer of lines for the hot gaseous reactants should be heavily insulated and as short as possible.

Having described three embodiments of my invention, all of which rely upon the introduction of oxygen into a system in such a manner that it initially contacts carbon monoxide and hydrogen substantially free from methane and introducing methane in such a manner that it initially contacts carbon dioxide and steam substantially free from oxygen, and all three of which permit the production of carbon monoxide and hydrogen from methane and oxygen, without the production of appreciable amounts of carbon or other undesirable products, what I claim is:

The method of manufacturing a gas mixture consisting essentially of hydrogen and carbon monoxide which method comprises circulating a mass of fluidized solids through an upflow reforming zone and a downflow combustion zone in a cyclic manner whereby a substantial part of the gases entrained in the fluidized solids is carried thereby from the upper part of the reforming zone to the upper part of the combustion zone and entrained gases are similarly carried by the fluidized solids from the lower part of the combustion zone to the lower part of the reforming zone, maintaining the circulating fluidized solids at temperatures within the range of about 1500° to about 1800° F. by burning entrained combustible gases in the combustion zone with substantially nitrogen-free oxygen introduced at an intermediate low point in said combustion zone whereby the temperature of the solids is raised to a level substantially higher than 1500° F., flowing fluidized solids downwardly through said combustion zone at a rate of about 2 to 5 feet per second whereby the hot solids and gases entrained therewith are carried into the lower part of the reforming zone, introducing a gaseous hydrocarbon at a low point in said reforming zone in amounts sufficient to react with said combustion products to form carbon monoxide and hydrogen by means of the heat carried by the circulating fluidized solids stream whereby the volume of gases is increased in the reforming zone, maintaining a substantially lower bulk density of fluidized solids in the reforming zone than is maintained in the combustion zone for effecting fluidized solids circulation, releasing a portion of the carbon monoxide and hydrogen from the fluidized solids at the top of the reforming zone and carrying another portion of said carbon monoxide and hydrogen by entrainment in the fluidized solids to serve as the combustible gas in the combustion zone.

EDMOND L. D'OUVILLE.

References Cited in the file of this patent

UNITED STATES PATENTS

| Number | Name | Date |
|---|---|---|
| 403,921 | Cummings | May 28, 1889 |
| 1,576,787 | Reichhelm | Mar. 16, 1926 |
| 1,736,065 | Williams | Nov. 19, 1929 |
| 1,874,801 | Porter | Aug. 30, 1932 |
| 1,951,774 | Russell et al. | Mar. 20, 1934 |
| 1,960,912 | Larson | May 29, 1934 |
| 2,029,657 | Frey et al. | Feb. 4, 1936 |
| 2,378,342 | Voorhees et al. | June 12, 1945 |
| 2,428,872 | Gunness | Oct. 14, 1947 |
| 2,448,290 | Atwell | Aug. 31, 1948 |
| 2,523,284 | Eastman | Sept. 26, 1950 |